INVENTOR.
D.L. McKAY
BY Young & Quigg
ATTORNEYS 3,499,530
CRYSTAL SEPARATION
Dwight L. McKay, Bartlesville, Okla., assignor to Phillips Petroleum Company, a corporation of Delaware
Filed Jan. 23, 1967, Ser. No. 610,997
Int. Cl. B01d 33/02, 37/04
U.S. Cl. 210—67      5 Claims

ABSTRACT OF THE DISCLOSURE

An improved separation process wherein crystals and mother liquor are separated from a slurry by passing the slurry to a rotary filter in a filter zone and forming a crystal cake thereon, the mother liquor passing therethrough and being withdrawn from said zone, the crystal cake being discharged by a flow of blow gas from inside said filter at the desired point of discharge, said blow gas being heated to melt any frozen cake when the slurry reaches a predetermined level in said zone and a portion of the mother liquor being recycled to said zone to control the level of filter submergence therein.

---

Figure 1:
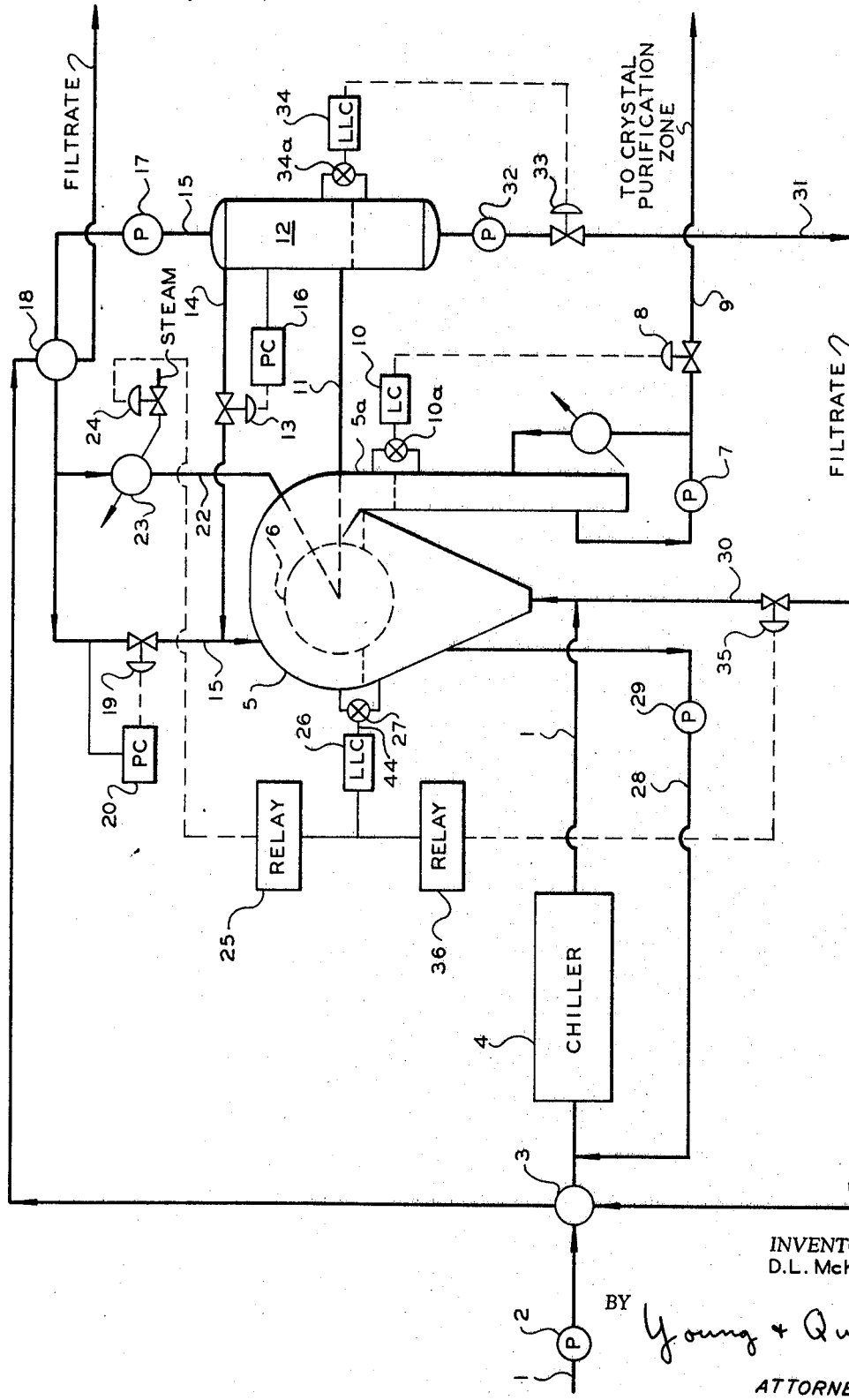

This invention relates to the separation of solids from liquids. In another aspect, this invention relates to an improved method and apparatus for removing crystals from crystal slurry mixtures in a process of separation by crystallization.

In the separation of components of liquid multi-component mixtures, crystallization methods are used effectively for systems forming eutectic-type phase behavior, since crystals separating from such a solution are presumed to be pure. As a practical matter, however, such crystals contain mother liquor trapped within the crystal interstices and this mother liquor is sometimes removed by the use of a rotary-drum vacuum filter whereby drying gases and/or wash liquids are pulled through a filter cake.

Thus, in most operations, the liquid multi-component mixture is chilled, causing one or more of the components therein to solidify in the form of crystals to thereby form a resulting crystal slurry. The resulting slurry is then passed to the filter pan of a rotary-drum filter. A rotatable filter drum having a porous filter surface on the periphery thereof is positioned in a drum housing above the filter pan so that a portion of the filter surface will contact the slurry in the pan. A suction is then applied from the interior of the drum as the drum is rotated to cause mother liquor from the slurry to be passed through the filter surface. This suction action leaves crystals on the crystal surface which in turn form a resulting crystal cake. An inert drying gas is supplied to the upper part of the drum housing so that the gas will be pulled through the filter cake as it rotates on the filter drum above the slurry level. This filter cake is then removed from the filter surface by the action of a blow gas which passes from the interior of the filter drum through the filter surface and forces the crystals from the filter surface at the desired point of crystal discharge.

Problems have occurred when utilizing the above-mentioned rotary vacuum filter due to the accumulation of crystals in the filter pan and the resulting formation of a solid crystalline mass commonly referred to as an "iceberg."

Problems have also occurred when the crystals accumulated on the filter surface freeze across the openings therein to thereby cause the filter surface to be impermeable to the flow of mother liquor and drying gases. The accumulation of this frozen crystal layer commonly referred to as "blinding" normally causes the throughput of the filter to decrease until it must be shut down for removal of the frozen mass of crystals covering the openings in the filter surface.

Therefore, one object of this invention is to provide a novel method for preventing crystal accumulation and resultant solid crystal masses in the pan of a rotary-drum filter.

Another object of this invention is to provide a novel method for automatically cleaning the filter surface of a rotary-drum filter.

Other objects and advantages of this invention will be readily apparent to one skilled in the art upon a study of this disclosure.

According to one embodiment of this invention, mother liquor from a rotary-drum filter is recycled to the crystal slurry in the filter pan thereof in response to the slurry level in said pan so that a constant level in the pan can be maintained. Furthermore, a relative constant percentage (from about 15 to 50 percent) of the filter surface of the rotary drum will be submerged at all times. Conventionally, only 5 to 10 percent of the drum surface is submerged. The high level of drum submergence maintained according to this embodiment will cause a constant agitating motion near the surface of the slurry mixture as the drum turns which thereby reduces the likelihood of forming a settled mass of crystals in the pan. Also, the mother liquor recycled to the drum contains very few, if any, crystals and the addition of this mother liquor to the slurry will result in a slurry having a weaker concentration of crystals therein which in turn will also reduce the tendency to form the coherent masses of crystals in the pan.

According to another embodiment of this invention, heat is applied to the blow gas which blows the crystals from the filter surface as the level of the slurry in the filter pan approaches the predetermined upper limit. The heat supplied to the blow gas stream increases proportionally as the level of slurry in the said rotary filter zone increases above the said predetermined level. In this manner, the warmed blow gas will tend to melt the crystal cake near the point of discharge of the crystal cake from the filter surface. This blow gas will melt any frozen and impermeable portions of the filter cake from the filter surface to thereby provide a clean filter surface through which drying gases and mother liquor can pass to thereby leave crystals deposited on the said surface. Thus, it is readily seen by the operation of this embodiment, not only are the desired slurry level within the filter pan and the desired amount of drum submergence maintained but the filter surface is automatically cleaned when it becomes fouled with frozen crystal masses.

Figure 2:
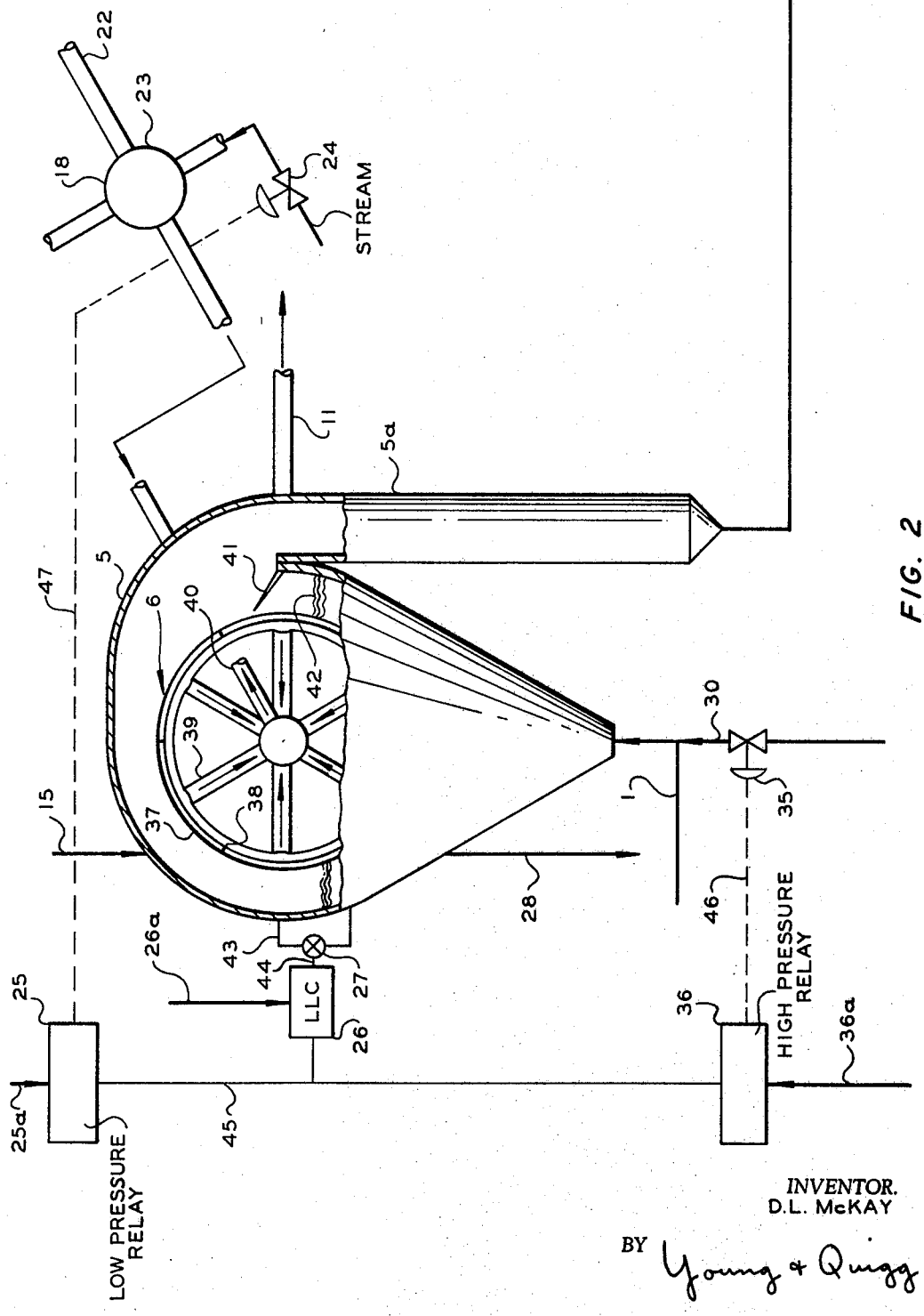

This invention can be more easily understood from a study of the drawings in which FIGURE 1 is a schematic illustration of this invention and FIGURE 2 is an illustration partly in section of the preferred embodiment of this invention.

Now referring to FIGURE 1, a multi-component feed mixture is passed to chiller 4 via conduit 1, pump 2, and precooler 3 wherein at least one component solidifies and a resulting crystal slurry is formed. The resulting crystal slurry is then passed to rotary-drum filter 5 via conduit 1 wherein crystals are separated from mother liquor by the action of rotary drum 6. The crystals from rotary-drum filter 5 are withdrawn via conduit 5a and then ultimately passed to a crystal purification zone (not shown in FIGURE 1) via pump 7, valve 8, and conduit 9. The amount of crystal slurry passing through valve 8 is controlled by level controller 10 in response to sensor 10A.

Mother liquor and inert drying gas, such as helium or nitrogen, are withdrawn from rotary-drum filter 5 via conduit 11 and are passed through separator 12. A portion of the inert gas from separator 12 is passed to conduit 14 via valve 13, said valve being manipulated by pressure controller 16 in response to the pressure within separator 12. The majority of the inert gas passes directly into conduit 15 by the action of vacuum pump 17 and passes through heat exchanger 18 and valve 19 into the housing of rotary-drum 5. A portion of this stream passes to the blow-back pipe within rotating drum 6 via conduit 22. The quantity of gas passing to the housing is controlled by valve 19 in response to pressure controller 20. The gas passing through conduit 22 is heated by steam heater 23 in response to steam valve 24 which is in turn controlled by relay 25 and liquid level controller 26. Liquid level controller 26 receives its measured input from liquid level sensor 27.

The slurry level within rotary-drum filter 5 is maintained by the slurry passing into the rotary filter via conduit 1, a constant amount of slurry being recycled around chiller 4 via conduit 28 and pump 29, and the mother liquor that is passed back into conduit 1 via conduit 30. The mother liquor from separator 12 passes to conduit 31 via pump 32 and valve 33 in response to liquid level controller 34 controlled by sensor 34a. A portion of the mother liquor flowing through conduit 31 passes into conduit 30 in response to the opening of valve 35, which is in turn controlled by relay 36 and liquor level controller 26. The remaining portion of the mother liquor is passed to heat exchanger 3 wherein it extracts heat from the feed entering chiller 4, and heat exchanger 18 wherein it extracts heat from the inert gas flowing through conduit 15. Thus, it is readily seen that liquid level controller 26, in response to liquid level sensor 27, will control the level of slurry within rotary-drum filter 5 and, consequently, the degree of drum submergence within said rotary-drum filter 5, as well as the temperature of the blow gas entering the blow pipe in rotary drum 6 via conduit 22. Relays 25 and 36, liquid level controller 26, and liquid level sensor 27 can be either electrically or pneumatically actuated control devices known in the control art.

FIGURE 2 is an illustration partly in section of the preferred embodiment of this invention which utilizes pneumatically actuated control devices. In FIGURE 2, there is shown rotary vacuum filter 5, and the control mechanism in detail. Rotary drum 6 comprises filter cloth 37 resting on supports 38 which extend from the body of drum 6. The inert gas entering the housing of rotary filter 5 via conduit 15 and mother liquor from the slurry are pulled through conduits 39 and out conduit 11 to separator 12 by the action of vacuum pump 17. A blow gas from conduit 22 passes out blow pipe 40 through filter cloth 37 to thereby blow the crystals from the filter cloth and deposit them on doctor blade 41. The crystals are subsequently removed via conduit 5A. Liquid level sensor 27 senses the level of slurry 42 within the filter pan of rotary filter 5 through control leads 43. The output from liquid level sensor 27 is transferred to liquid level controller 26 via conduit 44 wherein it is compared with set point 26a. Liquid level controller 26 may be any suitable type controller known in the art, but preferably one with set point signal input 26a, a measurement signal input, and a control signal output. The output from liquid level controller 26 passes to low pressure relay 25 and high pressure relay 36 via line 45. Low pressure relay 25 can be any type low pressure relay known in the control art, such as the 1:1 selector relay disclosed in U.S. Patent 2,973,722. Likewise, high pressure relay 36 can be any type of high pressure relay known in the control art, such as the high pressure selector disclosed in U.S. Patent 2,973,722. Reference inputs 25a and 36a to low pressure relay 25 and high pressure relay 36, respectively, are of the same magnitude and are connected to the normal air supply inputs for the respective controllers. The signal transmitted via conduit 45 is connected to the normal signal inputs for the respective relays and thereby serves as the signal input thereto. Valve 35 is a reverse-opening valve which opens with an increasing signal and valve 24 is a direct-opening valve which opens with a decreasing signal. Thus, when the slurry level is below the desired slurry level as indicated by set point input 26a of liquid level controller 26, the output signal from liquid level controller 26 is transferred to high pressure relay 36 via conduit 45 and will be of greater magnitude than reference signal 36a. Therefore, the output signal transferred from conduit 45 will be transferred to conduit 46 and to valve 35 to thereby cause the valve to open. The same output signal from liquid level controller 26 will pass to low pressure relay 25 via line 45 but it will be of greater magnitude than reference signal 25a. Therefore, the output from low pressure relay 25 transferred via line 47 will have no effect on valve 24 which is closed. As the slurry level approaches the desired level, the output from liquid level sensor 27 will approach the set point 26a of liquid level controller 26. When the slurry level exceeds the desired level, the magnitude of the output transferred via line 45 will be less than the reference signals 25a and 36a. This will result in valve 35 being closed and valve 24 being opened. Valve 24 will continue to open wider with decreasing signals from liquid level controller 26 which is indicative of a rising slurry level until valve 24 is wide open.

Thus, it is readily seen that the slurry is maintained at the desired level within rotary filter 5 by the coordinated action of valve 35, which introduces more mother liquor into the pan of the rotary filter when the slurry level is below the desired level, and the action of valve 24, which controls the heat supply to blow gas flowing out blow pipe 40 when the slurry level is above the desired level, which in turn melts any fused crystal cake on the crystal surface 37 to thereby allow more mother liquor and drying gases to pass to the interior of rotary-drum 6. The following example is inserted to better illustrate one embodiment of this invention.

EXAMPLE

Controller 26 is adjusted to put out a 15 p.s.i.g. signal when slurry level is at its lower limit, a 9 p.s.i.g. signal when slurry level is normal or in middle of range, and a 3 p.s.i.g. signal when slurry level is at its upper limit. Thus, starting with a clean filter cloth and maximum fiiltration rates, valve 35 will be wide open in response to a 15 p.s.i.g. signal from controller 26 via relay 36 which only passes a signal greater than 9 p.s.i.g. since a 9 p.s.i.g. bias signal is applied to 36. As the filter cloth fouls and filtration rate decreases, slurry level rises in the pan, signal 45 decreases, say to 12 p.s.i.g., and valve 35 closes partially, thus maintaining slurry level in the pan within desired limits. With additional fouling and filtration rate decrease, slurry level rises, signal 45 decreases to 9 p.s.i.g., and valve 35 is completely closed. During above operation valve 24 has been closed, i.e. blow gas has not been heated because relay 25 will not pass a signal from 26 that is greater than 9 p.s.i.g. But now, with a nearly completely fouled filter, signal 45 decreases to, say, 8 p.s.i.g. and relay 25 passes this signal to valve 24 which heats the blow gas and begins melting crystals on the fouled filter cloth. As fouling is eliminated, filtration rate increases, slurry level in pan drops, signal 45 increases above 9 p.s.i.g., thus closing valve 24 and opening 35.

It must be understood that any workable combination of control devices known in the art can be used to carry out this invention. For example, relay 36 can be a low pressure relay when valve 35 is a direct-opening valve, and relay 25 can be a high pressure relay when valve 24 is a reverse-opening valve when utilizing a pneumatic control system. Also, it must be noted that liquid level controller 26 can be connected separately either to valve 35 or valve 24 in order to carry out the separate embodiments of this invention singularly. Therefore, when liquid level controller 26 is connected directly to valve 35, the level of slurry within the rotary-drum filter 5 can be accurately controlled and consequently, the degree of drum submergence therein, which in turn will cause a constant rotating motion near the top of the crystals floating in the slurry to thereby prevent any crystal agglomeration and mass formation in the filter pan. Also, when liquid level controller 26 is connected directly to valve 24, filter cloth 37 can be automatically cleaned of any "binding" by hot blow gases when the slurry level within the rotary-drum filter 5 exceeds a predetermined level.

I claim:

1. In a separation process wherein a feedstream containing a crystal slurry comprising crystals and mother liquor is passed to a slurry filter zone wherein a filter cake is formed on the exterior of a rotating filter surface surrounding a rotary filter zone while said surface is submerged in said slurry, drying gases and mother liquor are passed through said filter cake to the interior of said rotary filter zone, mother liquor and drying gases are withdrawn from the interior of said rotary filter zone, said filter cake is discharged from said filter surface by a flow of blow gas that is passed through said filter cake at the point where said filter cake is discharged from the filter surface of the rotary filter zone, and said filter cake is ultimately passed to a crystal purification zone; the improvement comprising passing a portion of said mother liquor withdrawn from said rotary filter zone back to the slurry in said rotary filter zone whenever necessary during the entire process to maintain a predetermined level of slurry therein and to thereby control the level of rotary filter surface submergence in the slurry.

2. In a separation process wherein a feedstream containing a crystal slurry comprising crystals and mother liquor is passed to a slurry filter zone wherein a filter cake is formed on the exterior of a rotating filter surface surrounding a rotary filter zone while said surface is submerged in said slurry, drying gases and mother liquor are passed through said filter cake to the interior of said rotary filter zone, mother liquor and drying gases are withdrawn from the interior of said rotary filter zone, said filter cake is discharged from said filter surface by a flow of blow gas that is passed through said filter cake at the point where said filter cake is discharged from the filter surface of the rotary filter zone, and said filter cake is ultimately passed to a crystal purification zone; the improvement comprising passing a portion of said mother liquor withdrawn from said rotary filter zone back to the slurry in said rotary filter zone whenever necessary during the entire process to maintain a predetermined level of slurry therein and to thereby control the level of rotary filter surface submergence in the slurry, further comprising heating said blow gas when the level of the slurry in said rotary filter zone exceeds said predetermined level to thereby melt said crystal cake and remove any frozen and impermeable portions of said crystal cake from said filter surface which will thereby allow more mother liquor and drying gas to pass through said filter surface.

3. The method of claim 2 wherein the amount of heat supplied to said blow gas increases proportionally as the level of slurry in said rotary filter zone increases above said predetermined level.

4. The method of claim 3 wherein said predetermined level is that level sufficient to submerge from 15 to 50 percent of the surface area of said rotary filter surface under the slurry in said rotary filter zone.

5. In a separation process wherein a feedstream containing a crystal slurry comprising crystals and mother liquor is passed to a slurry filter zone wherein a filter cake is formed on the exterior of a rotating filter surface surrounding a rotary filter zone while said surface is submerged in said slurry, drying gases and mother liquor are passed through said filter cake to the interior of said rotary filter zone, mother liquor and drying gases are withdrawn from the interior of said rotary filter zone, said filter cake is discharged from said filter surface by a flow of blow gas that is passed through said filter cake at the point where said filter cake is discharged from the filter surface of the rotary filter zone, and said filter cake is ultimately passed to a crystal purification zone; the improvement comprising heating said blow gas when the level of the slurry in said rotary filter zone exceeds a predetermined level to thereby melt said crystal cake and remove any frozen and impermeable portions of said crystal cake from said filter surface which will thereby allow more mother liquor and drying gas to pass through said filter surface.

References Cited

UNITED STATES PATENTS

| 2,738,258 | 3/1956 | Berg | 210—196 X |
|---|---|---|---|
| 3,029,948 | 4/1962 | McKay | 210—68 |
| 3,163,601 | 12/1964 | Ericson et al. | 210—196 |
| 3,212,639 | 10/1965 | Anderson | 210—196 X |
| 3,245,536 | 4/1966 | McKay | 210—77 |
| 2,977,234 | 3/1961 | Wenzelberger | 210—71 X |
| 3,289,838 | 12/1966 | Garrett | 210—71 X |

SAMIH N. ZAHARNA, Primary Examiner

U.S. Cl. X.R.

210—68, 77, 82, 106, 149